United States Patent
Ashley (10) Patent No.: US 8,650,245 B1
(45) Date of Patent: Feb. 11, 2014

(54) SYSTEMS AND METHODS FOR PROVIDING ADAPTIVE VIEWS OF DOMAIN NAME SYSTEM REPUTATION DATA

(75) Inventor: Peter Ashley, Hopkinton, MA (US)

(73) Assignee: Symantec Corporation, Mountain View, CA (US)

( * ) Notice: Subject to any disclaimer, the term of this patent is extended or adjusted under 35 U.S.C. 154(b) by 637 days.

(21) Appl. No.: 12/428,353

(22) Filed: Apr. 22, 2009

(51) Int. Cl.
*G06F 15/16* (2006.01)

(52) U.S. Cl.
USPC ...................................................... 709/203

(58) Field of Classification Search
USPC ........................................................ 709/203
See application file for complete search history.

(56) References Cited

U.S. PATENT DOCUMENTS

| | | | |
|---|---|---|---|
| 2007/0088789 A1* | 4/2007 | Berman | 709/206 |
| 2010/0005191 A1* | 1/2010 | Drako et al. | 709/238 |
| 2010/0115040 A1* | 5/2010 | Sargent et al. | 709/206 |
| 2012/0271890 A1* | 10/2012 | Judge et al. | 709/206 |

* cited by examiner

*Primary Examiner* — Ryan Jakovac
(74) *Attorney, Agent, or Firm* — Holland & Hart LLP (57) ABSTRACT

A method implemented by a computing component for providing adaptive views of reputation data associated with a domain name system query is described. A domain name system query is received. A filter portion within the query is identified. A virtual zone file is queried according to the filter portion of the query. A response to the query is generated. The response comprises an analysis of the reputation data according to the filter portion.

20 Claims, 7 Drawing Sheets

SYSTEMS AND METHODS FOR PROVIDING ADAPTIVE VIEWS OF DOMAIN NAME SYSTEM REPUTATION DATA

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors.

Users of computer systems may communicate with one another via these systems. For example, computer systems may transmit and receive electronic mail (e-mail). E-mail may refer to a method of creating, transmitting, or storing primarily text-based human communications with digital communications systems (such as a computer system).

Unsolicited and/or unwanted e-mail messages may often be sent to a large number of recipients. This abuse of electronic messaging systems may be referred to as electronic spam. The originator of the spam e-mail may be referred to as a spammer. Spam e-mails may be typically marketing or advertisement in nature. Spamming is economically viable because advertisers have little (or no) operating costs beyond the management of their mailing lists. Because the barrier to entry is low, spammers are numerous, and the volume of unsolicited mail has become very high. Receiving spam e-mails is annoying and burdensome to the recipient who must parse through the e-mail messages to determine which are spam and which are not.

In order to reduce the volume of spam messages received, lists have been created which identify Internet Protocol (IP) addresses of computer systems from which spam messages have originated. If an electronic message is received, the IP address of the sender may be compared to such lists to determine if the message is spam. Currently, however, a user is not able to dynamically adapt queries to compare a particular IP address to a list in order to view additional reputation data for that IP address. As such, benefits may be realized by providing improved systems and methods for providing adaptive views of domain name system reputation data.

SUMMARY

A method implemented by a computing component for providing adaptive views of reputation data associated with a domain name system query is described. A domain name system query is received. A filter portion within the query is identified. A virtual zone file is queried according to the filter portion of the query. A response to the query is generated. The response comprises an analysis of the reputation data according to the filter portion.

In one embodiment, a physical zone file may be queried according to a non-filter portion of the query. The response may be transmitted to a client. In one embodiment, the computing component may communicate with a client via a first protocol. The response may be generated according to an "A" record protocol.

In another embodiment, the computing component may communicate with a domain name server according to a second protocol. The virtual zone file may be queried according to the second protocol. In one configuration, the second protocol may be a "TXT" record protocol.

In one example, a domain name system blacklist may be queried. The blacklist may include a list of Internet Protocol (IP) addresses of computing devices that may transmit spam e-mail messages. The filter portion may include reputation data selected from the group consisting of: a spam rating for IP addresses that transmit spam e-mail messages, a traffic rate, a spam rate, reputation block sources, and a non-configured reverse domain name system reputation. In one embodiment, the computing component may be a plug-in component for a domain name system server. In another embodiment, the computing component may be part of a domain name system server.

A computing component interfacing with a computer system is also described. The computing component may be configured to provide adaptive views of reputation data associated with a domain name system query. The component may include a query receiver configured to receive a domain name system query. In addition, the component may include a query analyzer configured to identify a filter portion within the query, and a query generator configured to query a virtual zone file according to the filter portion of the query. The component may also include a response generator configured to generate a response to the query. The response may provide an analysis of the reputation data according to the filter portion.

A computer-program product for providing adaptive views of reputation data associated with a domain name system query is also described. The computer-program product may include a computer-readable medium having instructions thereon. The instructions may include code programmed to receive a domain name system query, and code programmed to identify a filter portion within the query. The instructions may also include code programmed to query a virtual zone file according to the filter portion of the query, and code programmed to generate a response to the query. The response may provide an analysis of the reputation data according to the filter portion.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the exemplary embodiments described herein are susceptible to various modifications and alternative forms, specific embodiments have been shown by way of example in the drawings and will be described in detail herein. The exemplary embodiments described herein, however, are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In one embodiment, computing systems may include a mail transfer agent (MTA). The MTA may be a computer program or software agent installed on the computing system. In one embodiment, the MTA may transfer electronic mail (e-mail) messages from one computing system to another. In one example, an MTA may support an interface to a domain name system (DNS) based blacklist. A DNS blacklist (DNSBL) may be a means by which an Internet site publishes a list of Internet protocol (IP) addresses that should be avoided. The DNSBL may be published in a format that may be queried by a computer program (such as an MTA). In one embodiment, the DNSBL may include a list of IP addresses that are linked to spamming. The MTA may be configured to reject or flag e-mail messages which have been sent from a particular IP address.

Currently, an IP address that sends an e-mail message may be checked against a DNSBL by reversing the order of octets of the IP address. For example, the IP address 192.168.42.23 may be reversed to yield 23.42.168.192. In one embodiment, each DNSBL may be hosted under a particular domain name. The DNSBL's domain name may be appended to the reversed IP address (e.g., 23.42.168.192.dnsbl.example.net.) The reversed IP address and appended domain name may be queried as a domain name against IP addresses listed in a physical zone file (i.e., a DNSBL). If an IP address for the queried domain name is listed in the zone file, the e-mail message may be rejected or flagged as spam. A response that includes the IP address for the queried domain name may be referred to as an "A" record. A binary representation (i.e., IP address) provided by the "A" record, however, implies that multiple physically different zone files may be required to provide a specified output. In order to have a variety of different information for an IP address on the DNSBL, different databases may be created and published in a DNS server. For example, if a user desires to block IP addresses which send spam 99% of the time, a first database may be queried. If the user desires to block IP addresses which only send spam 85% of the time, a second database may be required, etc. Supporting permutations of different information may generate a proliferation of zone files (i.e., DNSBLs) which consume resources and limit flexibility. As such, benefits may be realized by providing systems and methods for dynamically providing different DNS information output streams from a single DNS information source.

Figure 1:
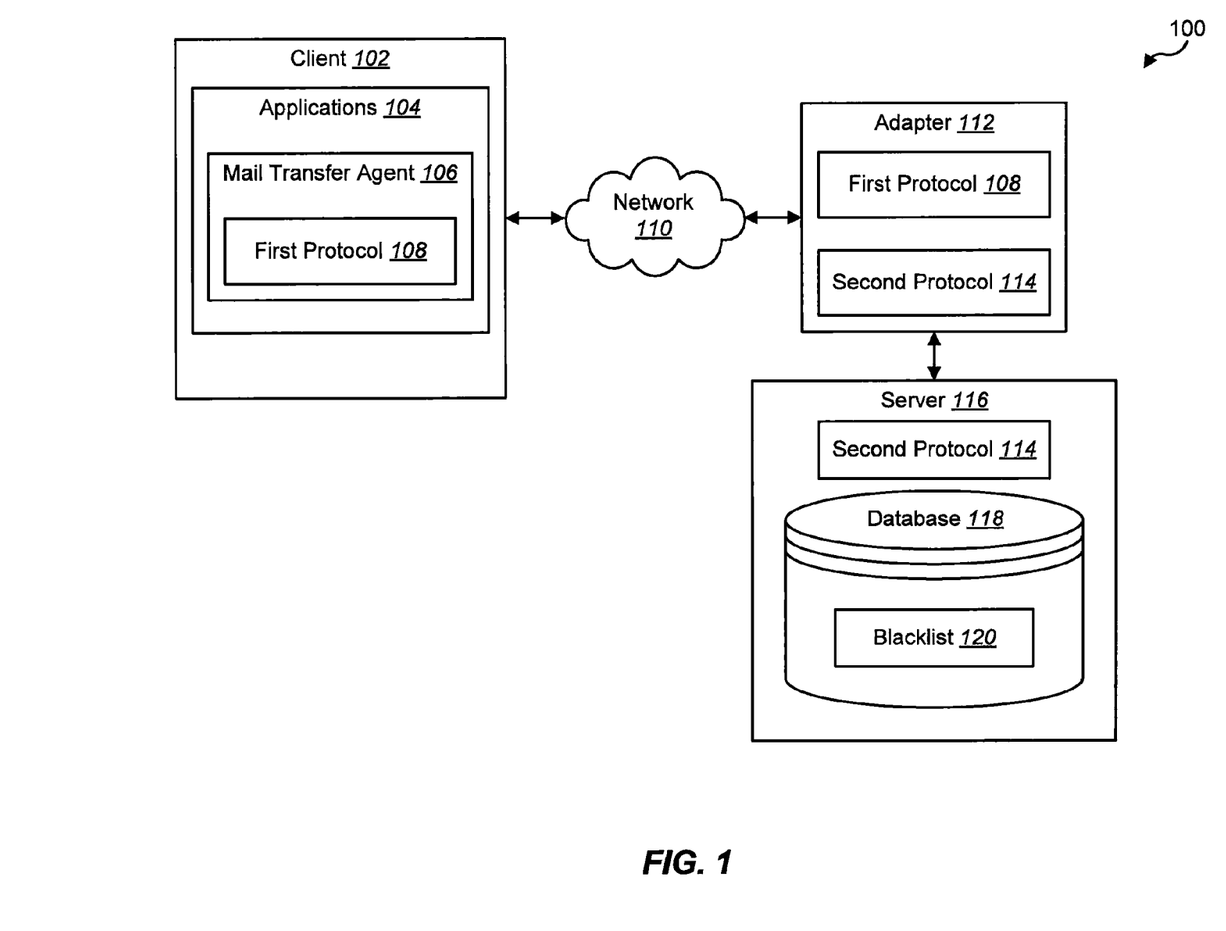
FIG. 1 is a block diagram illustrating one embodiment of a client-server environment in accordance with the present systems and methods.

FIG. 1 is a block diagram illustrating one embodiment of a client-server environment 100 in accordance with the present system and methods. In one configuration, a client 102 may communicate with a server 116 via a network connection 110. The client 102 may be a computing device such as a personal computer, a laptop, a personal digital assistant (PDA), a mobile communications device, etc. The server 116 may be a DNS server.

The client 102 may include one or more applications 104. One example of an application 104 may be a mail transfer agent (MTA) 106. The MTA 106 may facilitate e-mail messages from being sent from and received by the client 102. In one embodiment, the MTA 106 may communicate (or interface) with the server 116 via an adapter 112. In one configuration, the adapter 112 may be a proxy to the server 116. In another configuration, the adapter 112 may be a plug-in component for the server 116.

In one configuration, the MTA 106 may interface with the adapter 112 via a first protocol 108. The server 116 may interface with the adapter 112 via a second protocol 114. For example, a query may be received by the adapter 112 via the first protocol 108. The adapter 112 may communicate the query to the server 116 via the second protocol 114. Similarly, a response to the query may be received by the adapter 112 via the second protocol 114, and the response may be transmitted to the client 102 via the first protocol 108.

The server 116 may include a database 118. In one embodiment, the database 118 may store a blacklist 120. The blacklist 120 may be a DNSBL which includes a list of IP addresses that may send possible spam e-mail messages. The blacklist 120 may be referred to as a physical zone file. In one example, the adapter 112 may query an IP address against the blacklist 120 via the second protocol 114. If the queried IP address is on the blacklist 120, a response may be returned to the adapter 112 via the second protocol. The adapter 112 may edit or modify the response and then deliver the response to the client 102 via the first protocol 108.

Figure 2:
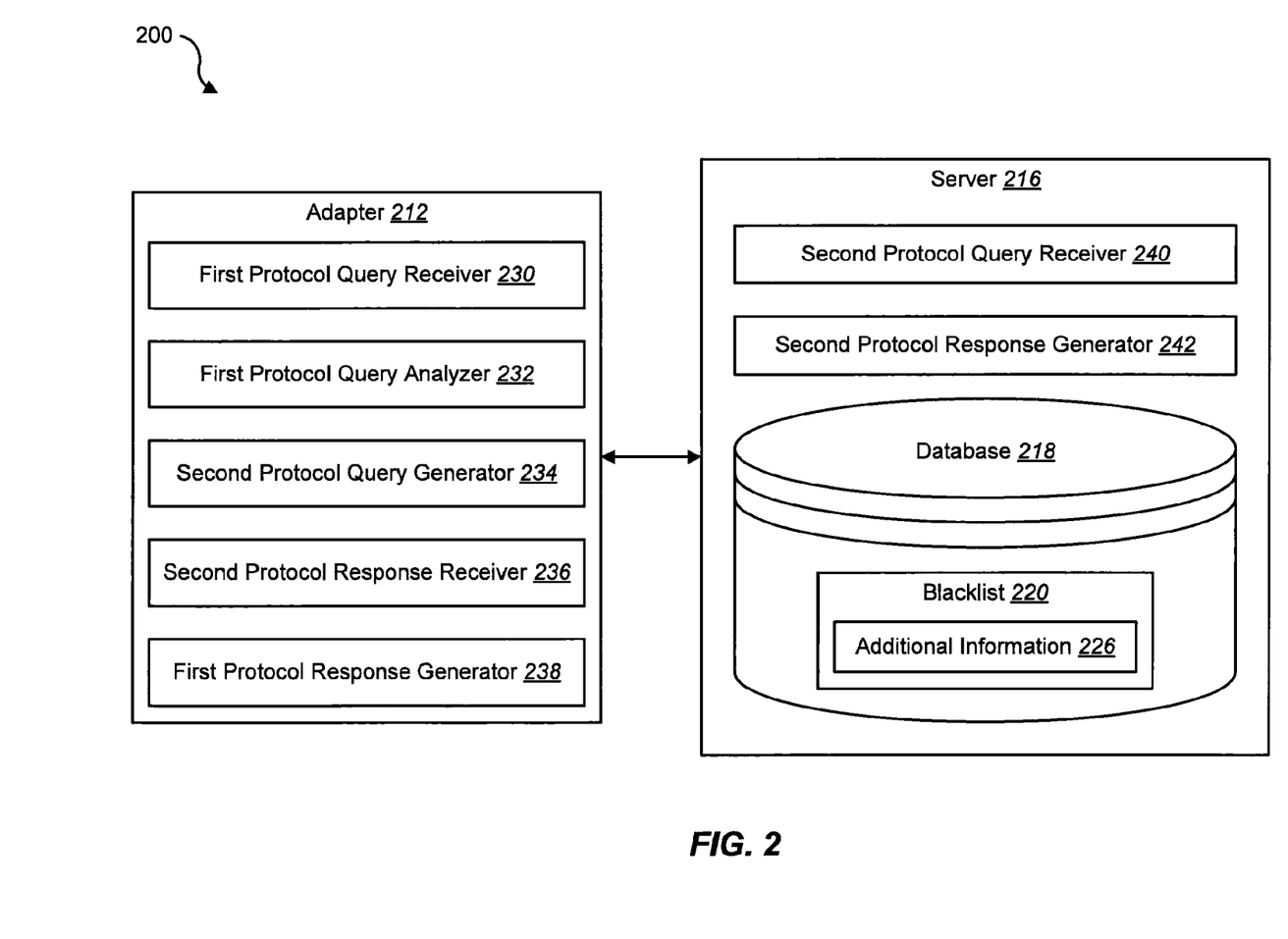
FIG. 2 is a block diagram illustrating one embodiment of an adapter interfacing with a server.

FIG. 2 is a block diagram illustrating one embodiment of an adapter 212 interfacing with a server 216. As previously explained, the adapter 212 may function as a proxy to the server 216. Alternatively, the adapter 212 may be a plug-in component to the server 216. In one embodiment, the adapter 212 may include a first protocol query receiver 230, which may receive queries from a client 102 via a first protocol. For example, the receiver 230 may receive a query from the MTA 106 to check whether a particular IP address attempting to send an e-mail message is included on a DNS blacklist 220. The DNS blacklist 220 may be stored in a database 218 on the server 216. The MTA 106 may interface with the first protocol query receiver 230 via an "A" record protocol, as explained above.

In one embodiment, the adapter 212 may also include a first protocol query analyzer 232 which analyzes the received query. In one example, a query according to the first protocol may include reversed IP octets with the domain name of the DNS blacklist 220 appended to the least significant portion of the reversed octets. The query analyzer 232 may identify the various parts of the query. In one embodiment, the analyzer 232 may identify additional parts of the query. For example, the analyzer 232 may determine that the query includes a filtering portion which indicates the desired data that is to be returned to the client 102. The filtering portion will be described in more detail below.

The adapter 212 may also include a second protocol query generator 234. The generator 234 may generate a query based on the second protocol from the received query based on the first protocol. In one embodiment, the second protocol may be a "TXT" record protocol in order to acquire additional information 226 for each IP address listed on the DNS blacklist 220. As mentioned above, the DNS blacklist 220 may include a list of IP addresses of possible spammers. The blacklist 220 may also include additional information 226 for each of the IP addresses included in the list 220. For example, the additional information 226 may be a percentage that indicates the percentage of spam e-mails sent from a particular IP address. The additional information 226 may also indicate the volume of e-mail messages sent from a certain IP address. In one embodiment, the additional information 226 may include any type of reputation data associated with an IP address on the DNS blacklist 220. The adapter 212 may interface with the server 216 via a "TXT" record protocol in order to access the additional information 226 for each IP address on the blacklist 220.

In one embodiment, a second protocol response generator 242 may generate a response to the query. The generator 242 may generate a response via the second protocol. The response may be communicated to the adapter 212 and a second protocol response receiver 236 may receive the response. In one configuration, the adapter 212 may include a first protocol response generator 238 that generates a response via the first protocol. In order words, the adapter 212 interfaces with the server 216 via the second protocol to receive a response. The adapter 212 may then interface with the client 102 via the first protocol and provide the response to the client 102 via the first protocol.

In one example, the adapter 212 may modify the view of the data in the response provided to the client 102. The adapter 212 may modify the data in accordance with a filtering portion that may be included in the query. For example, the query may include a filtering portion that requests the IP addresses that send spam e-mail messages at least 99% of the time. As another example, the filtering portion may indicate that only IP addresses that send a certain volume of e-mail messages are to be included in the response. The filtering portion may be customized according to the desires of a particular user. The user may determine which data to view in a response based on the filtering portion provided in the query. The adapter 212 may use the filtering portion to provide the desired data view to the client 102.

Figure 3:
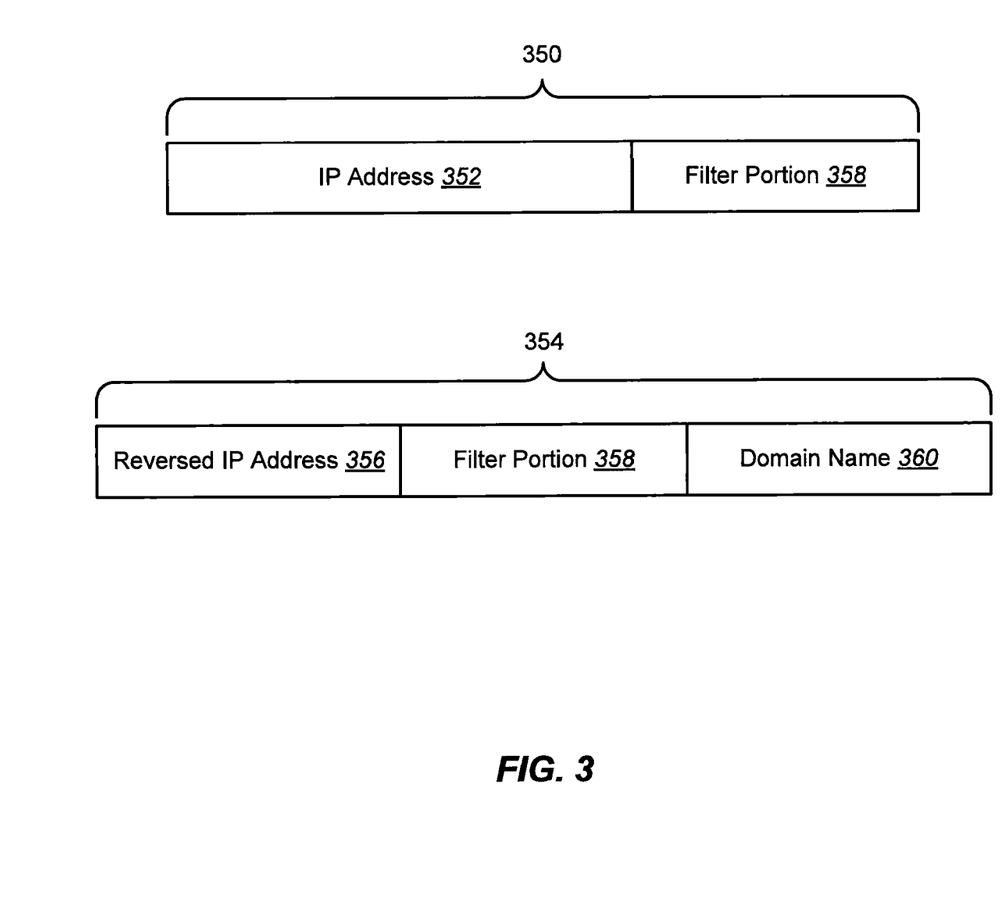
FIG. 3 is a block diagram illustrating one embodiment of a first protocol query and a second protocol query.

FIG. 3 is a block diagram illustrating one embodiment of a first protocol query 350 and a second protocol query 354. The first protocol query 350 may include an IP address 352 of a particular computing device attempting to send an e-mail message. In another embodiment, the IP address 352 may be a general address that identifies each IP address that may be included on a DNS blacklist 120. The query 350 may also include a filter portion 358. The filter portion 358 may include reputation data associated with the IP address 352. For example, the filter portion 358 may indicate that only IP addresses that send spam a certain percentage of time should be included in a response to the query 350. In another example, the filter portion 358 may specify a second reputation characteristic such as a data source identifier field. The first query 350 may be communicated between the client 102 and the adapter 112.

In one embodiment, the second protocol query 354 may include a reversed IP address 356. The reversed IP address 356 may consist of the IP address 352 with the octets reversed. The query 354 may also include the filter portion 358 appended to the least significant octet of the reversed IP address 356. In one embodiment, the query 354 may further include a domain name 360 which identifies the domain hosting a particular DNS blacklist 120. In one configuration, an MTA DNS blacklist function client may be configured with the filter portion 358 and the domain name 360 portion in order to remotely select the filter to be applied. In one embodiment, this may eliminate the need for modifications to the MTA to utilize the filter capability.

Figure 4:
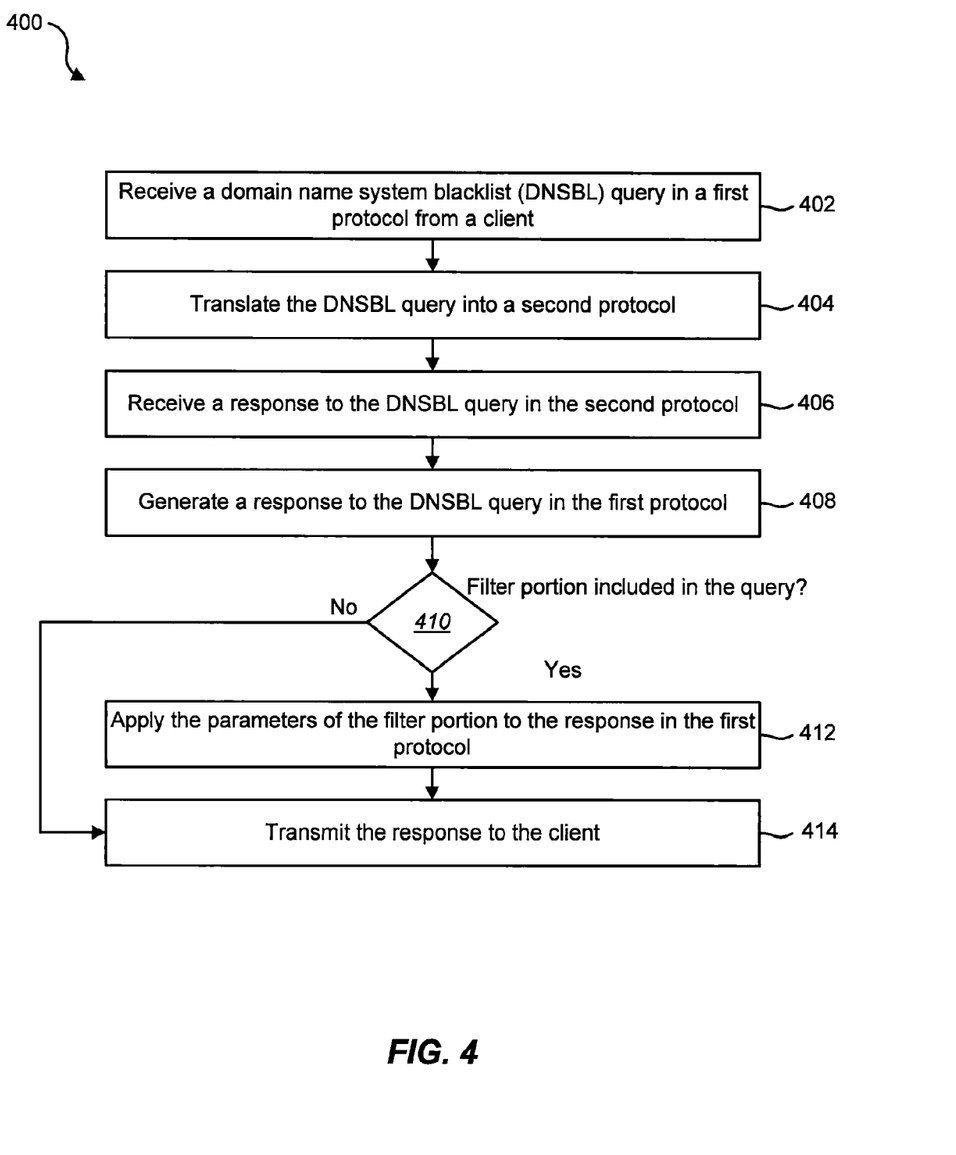
FIG. 4 is a flowchart illustrating one embodiment of a method for providing adaptive views of reputation data associated with a domain name system (DNS)

FIG. 4 is a flowchart illustrating one embodiment of a method 400 for providing adaptive views of reputation data associated with a DNS. In one configuration, the method 400 may be implemented by the adapter 112. In one embodiment, a DNSBL query in a first protocol may be received 402 from a client 102. The DNSBL query may include an IP address of a computing device attempting to send an e-mail message to the client 102. In another embodiment, the query may include a general IP address that identifies each address included on a DNSBL. The DNSBL query may be translated 404 from the first protocol into a second protocol. In one example, the first protocol is an "A" record protocol and the second protocol is a "TXT" record protocol. The adapter 112 may communicate the DNSBL query in the second protocol to a DNS server 116 and then receive 406 a response to the DNSBL query. In one embodiment, the received response may be in the second protocol.

Upon receiving the response in the second protocol, the adapter 112 may generate 408 a response to the DNSBL query in the first protocol. In other words, the adapter 112 may translate the response in the second protocol to the first protocol. In one embodiment, a determination 410 may be made as to whether a filter portion is included in the DNSBL query. For example, the filter portion may indicate that only IP addresses satisfying a certain reputation criteria should be included in the response to the query. The filter portion may indicate that only IP addresses whose spam reading is above a certain percentage should be included in the response. Alternatively, or in addition, the filter portion may indicate that only IP addresses that originate a certain volume of e-mail messages should be included in the response, etc.

If it is determined 410 that a filter portion is not included in the query, the response to the DNSBL query is transmitted 414 to the client 102 in the first protocol. In one embodiment, if it is determined 410 that the query includes a filter portion, the parameters of the filter portion may be applied 412 to the response, and then the response may be transmitted 414 to the client. In other words, the adapter 112 may dynamically alter the response in order to provide a view of the reputation data associated with IP addresses on the blacklist 120 that is desired by a user.

Figure 5:
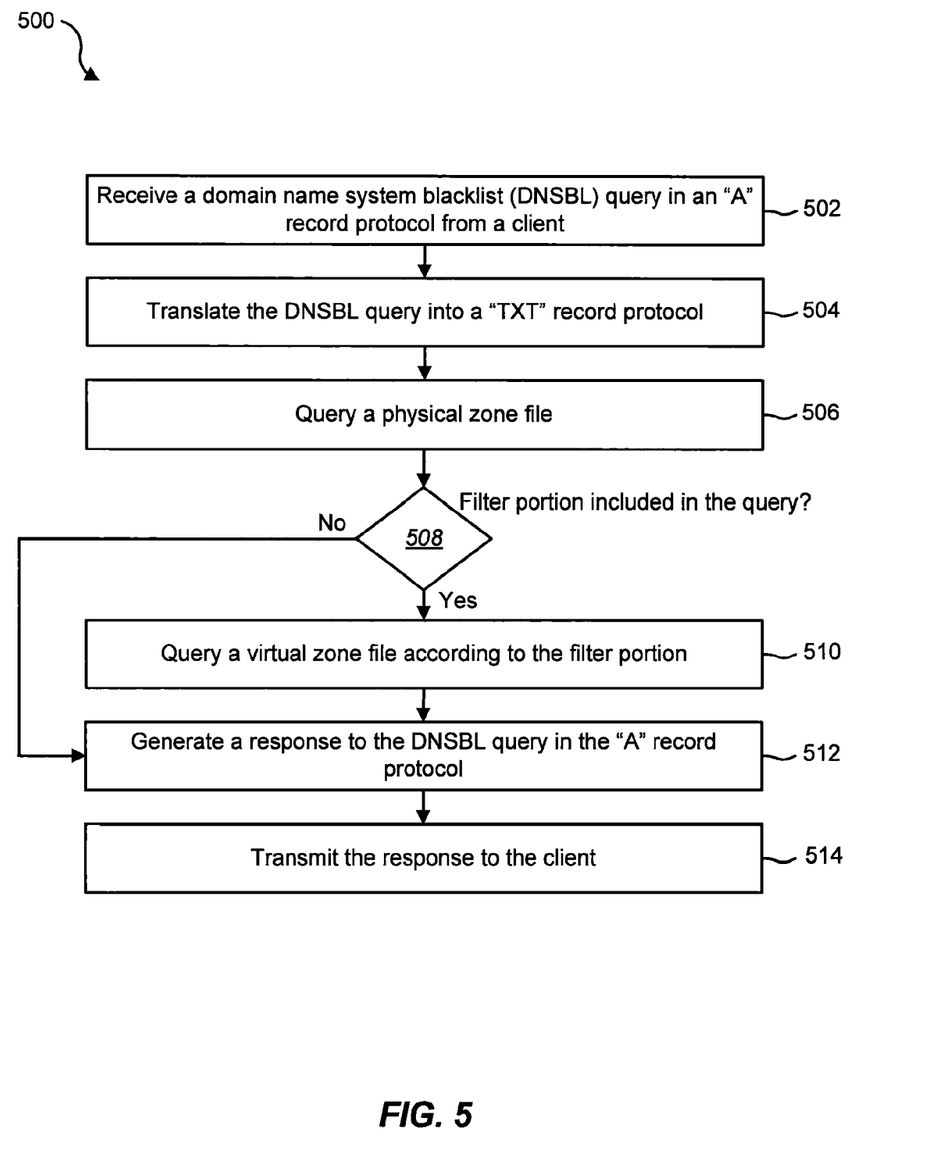
FIG. 5 is a flow chart illustrating one embodiment of a method for providing adaptive views of DNS reputation data using virtual zone files.

FIG. 5 is a flow chart illustrating one embodiment of a method 500 for providing adaptive views of DNS reputation data using virtual zone files. In one configuration, the adapter 112 may implement the method 500. A DNSBL query in an "A" record protocol may be received 502 from a client 102. The query may be translated 504 from the "A" record protocol into a "TXT" record protocol. For example, the query may be "1.1.1.1.b199.rep.spamrating.net" where "1.1.1.1" indicates a general IP address in the "A" record protocol and "rep.spamrating.net" may be a domain hosting a physical zone file (such as a DNS blacklist 120). Appending the domain name to the IP address may convert the query to the "TXT" record protocol. In one embodiment, the "b199" portion in the query may represent a filter portion. In this example, the "b199" may indicate that only IP addresses with a spam rating of at least 99% are to be included in a response to the query. The filter portion may represent reputation data in addition to spam rating. For example, the filter portion may represent reputation data relating to traffic rates, spam rates, reputation block sources, non-configured reverse DNS, etc.

The query mentioned above may be used to query 506 a physical zone file that may be stored in a database 118 of a DNS server 116. In one embodiment, a determination 508 may be made as to whether a filter portion is included in the query. If it is determined 508 that a filter portion is not included in the query, a response to the DNSBL query may be generated in the "A" record protocol. Using the above example, the response may include all IP addresses on the DNS blacklist 120 that have a spam rating, regardless of the spam rating value. If, however, it is determined 508 that a filter portion is included in the query, a virtual zone file may be queried 510. The file may be considered to be virtual because the filter portion may not map to a specific output in the physical zone file. In one embodiment, a filter portion of "b199" may cause a virtual zone file to be queried 510 in order to identify IP addresses within the DNS blacklist 120 that have a spam rating greater than 99%. The response to the DNSBL query may be generated 512 which includes the filtered data. The response may then be transmitted 514 to the client.

In one embodiment, the adapter 112 of the present systems and methods may provide adaptive views of reputation data associated with IP addresses in a DNS blacklist 120. A user may query a virtual zone using a filter portion in order to dynamically alter the responses received from a DNSBL query. In addition, the adapter 112 may communicate with a client 102 according to one protocol (e.g., an "A" record protocol) and communicate with a DNS server 116 according to another protocol (e.g., a "TXT" protocol). The adapter 112 may be separate from the DNS server 116. Alternatively, the adapter 112 may be part of the server 116. In addition, the adapter 112 may be a plug-in component for the DNS server 116.

Figure 6:
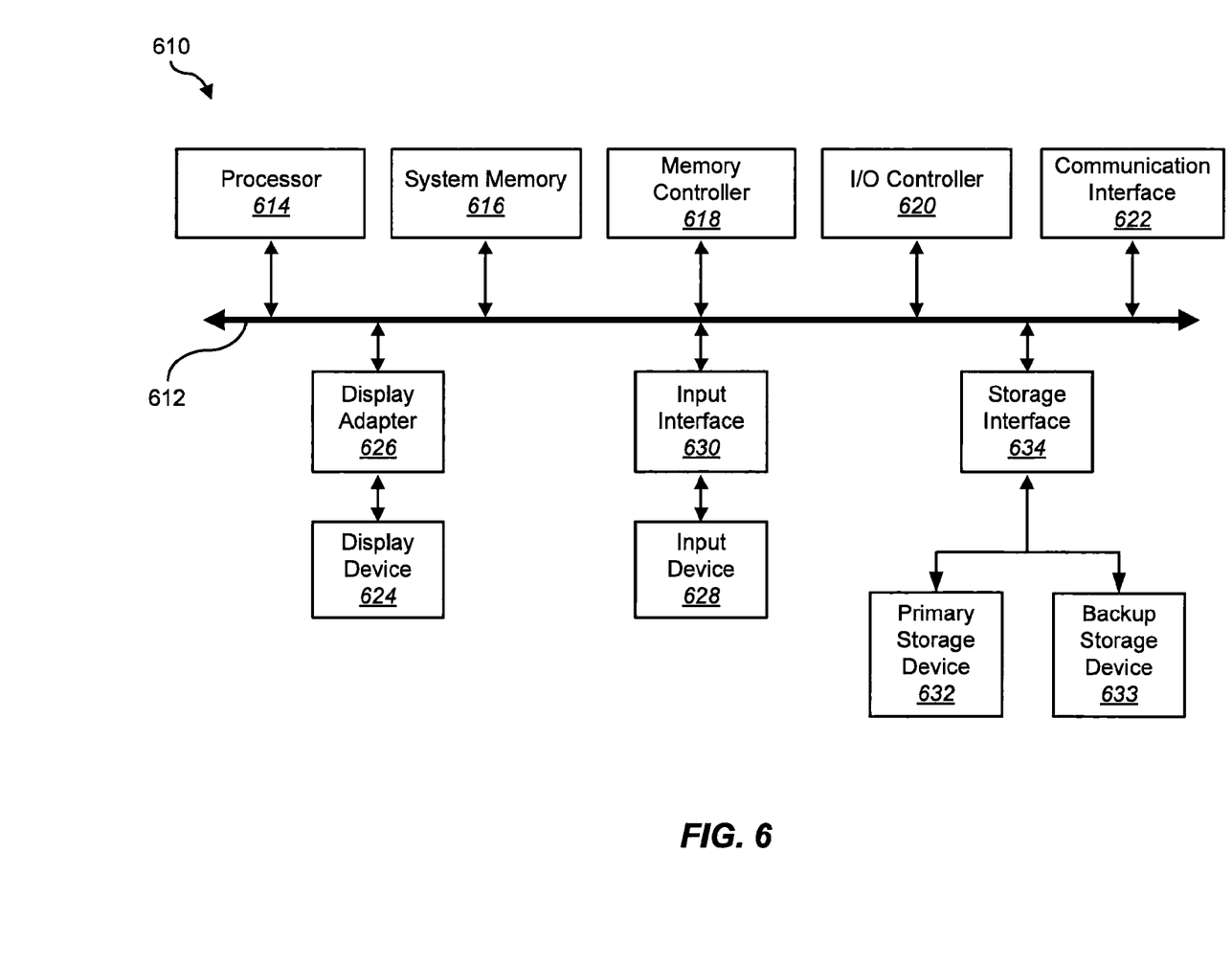
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the receiving, identifying, querying, and generating steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as receiving, identifying, querying, and generating.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for receiving, identifying, querying, and generating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the receiving, identifying, querying, and generating steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the receiving, identifying, querying, and generating steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Storage devices 632 and 633 may also be used, for example, to perform and/or be a means for performing, either alone or in combination with other elements, one or more of the receiving, identifying, querying, and generating steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
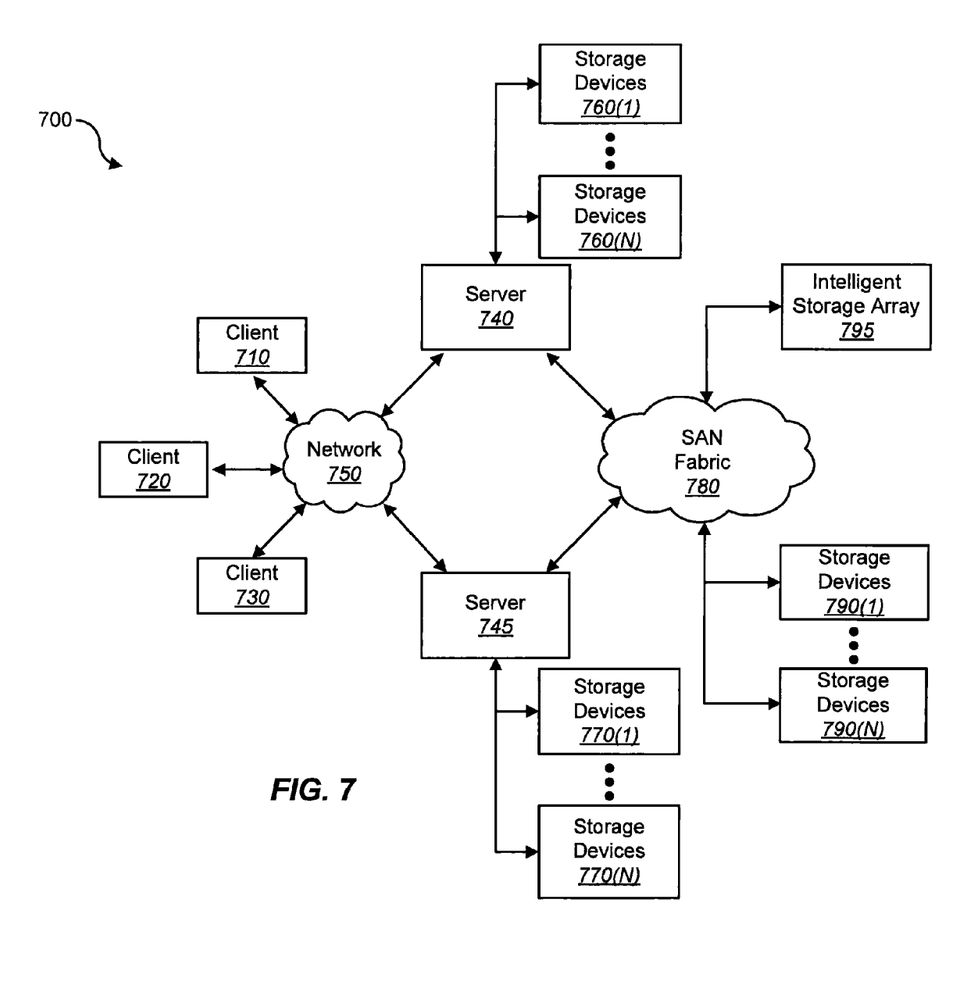
FIG. 7 is a block diagram of an exemplary network architecture in which client systems and servers may be coupled to a network.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the receiving, identifying, querying, and generating steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, computing system 610 and/or one or more of the components of network architecture 700 may perform and/or be a means for performing a computer-implemented method for providing adaptive views of reputation data associated with a domain name system query that may comprise: 1) receiving a domain name system query, 2) identifying a filter portion within the query, 3) querying a virtual zone file according to the filter portion of the query, and then 4) generating a response to the query, wherein the response comprises an analysis of the reputation data according to the filter portion.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method implemented by a computing component for providing adaptive views of reputation data associated with a domain name system query, comprising:

receiving a domain name system (DNS) query from a client;

querying a physical zone file of a DNS server based on the DNS query received from the client;

receiving a response to the DNS query from the DNS server;

determining whether the DNS query includes a filter portion; and upon determining the DNS query includes the filter portion, further comprising:

querying a virtual zone file according to the filter portion, the filter portion comprising a reputation criteria, wherein the reputation criteria does not map to an output of the physical zone file;

receiving a response to the virtual zone file query; and modifying the response to the DNS query from the DNS server to include data that satisfies both a criteria of the DNS query and the reputation criteria of the virtual zone file query.

2. The method of claim 1, further comprising transmitting the modified response to a client.

3. The method of claim 1, further comprising communicating with a client via a first protocol.

4. The method of claim 1, modifying the response to the DNS query further comprising modifying the response according to an "A" record protocol.

5. The method of claim 1, further comprising communicating with the DNS server according to a second protocol.

6. The method of claim 1, modifying the response to the DNS query further comprising translating the DNS query from a first protocol to a second protocol, wherein receiving the DNS query comprises receiving the DNS query in a first protocol.

7. The method of claim 6, wherein the first protocol is a "A" record protocol, and wherein the second protocol is a "TXT" record protocol.

8. The method of claim 1, wherein the physical zone file comprises a DNS blacklist, wherein the blacklist comprises a list of Internet Protocol (IP) addresses of computing devices that transmit spam e-mail messages.

9. The method of claim 1, wherein the reputation data comprises at least one of: a spam rating for IP addresses that transmit spam e-mail messages, a spam rate, or a non-configured reverse DNS reputation.

10. The method of claim 1, wherein the computing component is a plug-in component for a DNS server.

11. A computing system configured to provide adaptive views of reputation data associated with a domain name system query, comprising:
 a processor; and
 a memory in electronic communication with the processor;
 instructions being stored in the memory and being executable by the processor to:
 receive a domain name system (DNS) query from a client;
 querying a physical zone file of a DNS server based on the DNS query received from the client;
 receive a response to the DNS query from the DNS server;
 determine whether the DNS query includes a filter portion; and
 upon determining the DNS query includes the filter portion, further comprising:
 query a virtual zone file according to the filter portion, the filter portion comprising a reputation criteria, wherein the reputation criteria does not map to an output of the physical zone file;
 receive a response to the virtual zone file query; and
 modify the response to the DNS query from the DNS server to include data that satisfies both a criteria of the DNS query and the reputation criteria of the virtual zone file query.

12. The computing system of claim 11, wherein the instructions being executable by the processor to:
 perform the step of communicating with a client via a first protocol.

13. The computing system of claim 11, wherein the instructions being executable by the processor to:
 perform the step of modifying the response according to an "A" record protocol.

14. The computing system of claim 11, wherein the instructions being executable by the processor to:
 perform the step of communicating with a DNS server according to a second protocol.

15. The computing system of claim 11, wherein the instructions being executable by the processor to:
 perform the step of translating the DNS query from a first protocol to a second protocol, wherein receiving the DNS query comprises receiving the DNS query in a first protocol.

16. The computing system of claim 15, wherein the second protocol is a "TXT" record protocol.

17. The computing system of claim 11, wherein the physical zone file comprises a DNS blacklist, wherein the blacklist comprises a list of Internet Protocol (IP) addresses of computing devices that transmit spam e-mail messages.

18. A computer-program product for providing adaptive views of reputation data associated with a DNS query, the computer-program product comprising a non-transitory computer-readable storage medium storing computer executable instructions thereon, the instructions being executable by a processor to:
 receive a domain name system (DNS) query from a client;
 querying a physical zone file of a DNS server based on the DNS query received from the client;
 receive a response to the DNS query from the DNS server;
 determine whether the DNS query includes a filter portion; and
 upon determining the DNS query includes the filter portion, further comprising:
 query a virtual zone file according to the filter portion, the filter portion comprising a reputation criteria, wherein the reputation criteria does not map to an output of the physical zone file;
 receive a response to the virtual zone file query; and
 modify the response to the DNS query from the DNS server to include data that satisfies both a criteria of the DNS query and the reputation criteria of the virtual zone file query.

19. The method of claim 1, further comprising querying a physical zone file according to a non-filter portion of the DNS query.

20. The computing component of claim 11, wherein instructions being executable by the processor to:
 query a physical zone file according to a non-filter portion of the DNS query.

* * * * *